Aug. 29, 1967     R. M. CAIN     3,338,102
COMPRESSION TESTER
Filed Oct. 18, 1965
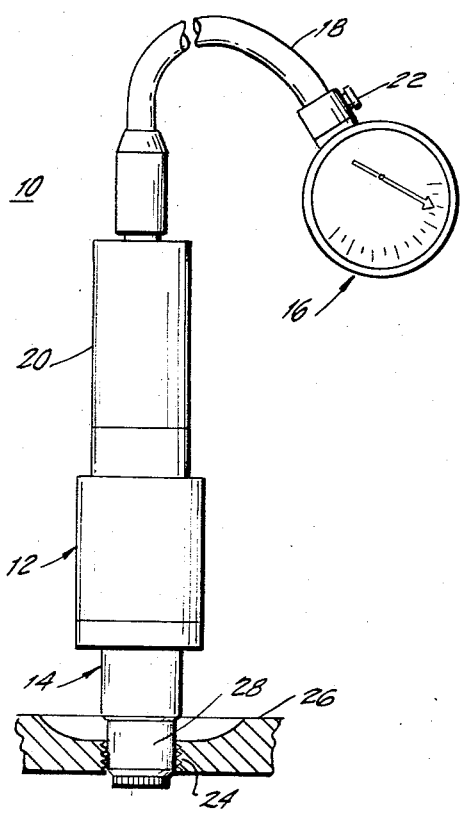
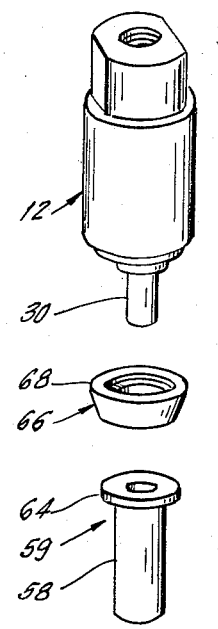
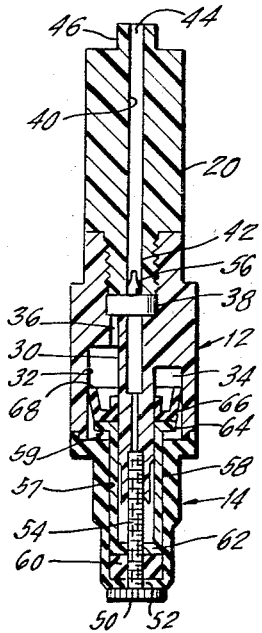
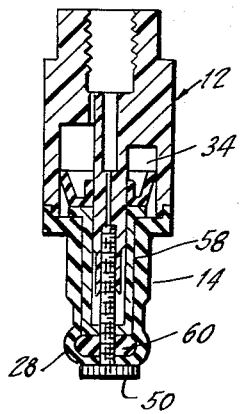
INVENTOR.
ROBERT M. CAIN
BY
OSTROLENK, FABER, GERB & SOFFEN
ATTORNEYS

United States Patent Office 3,338,102
Patented Aug. 29, 1967

3,338,102
COMPRESSION TESTER
Robert M. Cain, Kalamazoo, Mich., assignor to Kal-Equip Company, Inc., Otsego, Mich., a corporation of Michigan
Filed Oct. 18, 1965, Ser. No. 496,765
4 Claims. (Cl. 73—420)

This invention relates to pressure testing apparatus, and more particularly relates to a device for effecting fluid-tight communication between a pressure indicator and the interior of a chamber, the pressure of which is to be measured.

In the checking and servicing of automobiles or other equipment utilizing internal combustion engines, it is frequently necessary to determine the pressure developed within a cylinder. Since this pressure is usually relatively high, it is correspondingly difficult for a mechanic to hold the pressure-measuring apparatus in place solely by hand. Thus, it often happens that a pressure leak occurs between the measuring apparatus and the cylinder, which results in a lower reading on the indicator than the actual pressure within the cylinder. It has been found desirable, therefore, to provide a device which can be inserted into an opening of an enclosure, such as the spark plug opening of a cylinder, which device will fit snugly within such opening and will utilize the pressure developed within the enclosure for holding the device tightly within the opening during the pressure reading operation.

One prior art device for utilizing the pressure developed within the enclosure being tested for the purpose of holding the measuring device during the pressure reading operation, comprises a rigid cylindrical central portion, having a hollow tube passing centrally therethrough. One of the tube communicates with the interior of the chamber being tested by passing through an expandable nose member which is secured to the rigid central portion. The nose member in suitably dimensioned to fit snugly with the opening of the enclosure being tested. A port or aperture communicates with the interior of the hollow tube, as well as with a chamber formed within the rigid central portion by the exterior of the hollow tube and the interior walls of the rigid central portion, such that pressure build-up within the enclosure being tested is communicated through the hollow tube and port into the chamber. The interior of the expandable nose member is conically shaped and receives the conical end of a relatively rigid piston, the opposite end of which resides within the chamber. The conical end of the piston is urged into the conically shaped expandable nose in response to the build-up of pressure within the enclosure being tested, which build-up is communicated to the chamber and opposite end of the piston by means of the hollow tube and communicating port. Suitable pressure indicating means communicates with the interior of the enclosure being tested through the opposite end of the hollow tube, so that while the pressure within the enclosure is being measured by the pressure indicating means, the conical end of the piston is being urged deeper into the conically shaped resilient nose member. As the piston is urged into the nose, the nose expands, thereby urging its wall into firm pressure-tight contact with the wall surrounding the opening of the enclosure in which pressure is being measured.

The above described prior art device has been found to have one serious drawback which prevents its use in many high pressure environments. Specifically, it has been found that upon reduction of pressure within the chamber of the device, the conical end of the piston is so firmly seated within the mating nose, and the resulting frictional engagement between the two so great, that the natural elasticity of the expanded nose member (in its attempt to return to its relaxed condition), is insufficient to return the piston to its original position. Consequently, the piston remains, so to speak, "struck" within the expanded nose and it becomes extremely difficult, if not impossible, to withdraw the testing device from the wall of the enclosure which was tested.

The instant invention represents an improvement over the above described prior art device and virtually eliminates the above noted problem by providing a similar overall apparatus, but one in which the interior surfaces of the expandable nose portion are cylindrically, rather than conically, shaped so as to receive a small, cylindrical, compressible, gasket-like member which is diametrically expanded to urge the exterior walls of the nose portion into firm gripping contact with the walls of the enclosure in which pressure is being measured. Surprisingly, it has been found that upon a reduction of pressure, the natural resilience of the expanded nose portion is sufficient to return the gasket-like member to its relaxed shape and thereby urge the piston member back into its original position so that the device may easily be withdrawn from the enclosure. Although not conclusively proven, it is thought that the unexpected result achieved by the instant invention has been achieved primarily by the elimination of the high frictional forces developed when the conical piston of the prior art device was pressure-forced into its similarly shaped nose member.

It is therefore seen that an object of the instant invention is to provide a device for measuring pressure within an enclosure whereby the pressure developed within the enclosure is utilized for securely maintaining the pressure measuring device within the opening in which it is inserted.

It is another object of the instant invention to provide such a pressure-measuring device wherein a resilient expandable end portion thereof is expanded in response to and in direct proportion to the build-up of pressure within the enclosure being tested.

Yet another object of the instant invention is to provide such a pressure-measuring device in which the internal walls of the expandable end portion are cylindrically shaped and receive a small compressible gasket-like member which is diametrically expanded in response to the build-up of pressure within an internal chamber of the measuring device.

Still another object of the instant invention is to provide such a pressure-measuring device in which the aforementioned arrangement of a compressible gasket-like member within an expandable end portion permits the natural elasticity of the end portion to return the gasket-like element to its natural or relaxed state upon removal of the pressure build-up within the chamber of the device, thereby facilitating removal of the pressure-measuring device from the opening in which it has been inserted.

Other objects and a full understanding of the instant invention may be had by referring to the following specification and drawings, in which:

FIGURE 1 is a side view of the compression tester of the instant invention inserted within an opening of an enclosure, the pressure of which is to be measured;

FIGURE 2 is an exploded perspective view of the compression-measuring device of FIGURE 1;

FIGURE 3 is a cross-sectional view of the compression-testing device of FIGURE 1 in its relaxed state; and FIGURE 4 is a partial cross-sectional view similar to that of FIGURE 3 but showing the device in its operational state.

Referring to FIGURE 1, there is shown a compression-testing device 10 which includes a generally cylindrical, rigid central body portion 12, a resilient end member 14, and pressure indicator means 16 connected to the central body portion 12 through a flexible tube 18 and a cylindrical end plug 20. Pressure indicator means 16 includes a conventional relief valve 22 by which pressure developed within the compression tester may be relieved.

The resilient end member 14 is shown inserted in an opening 24 through a wall 26 of an enclosure, such as the cylinder of an internal combustion engine (not shown), the pressure within which is to be measured by the pressure indicator means 16. As will be explained in greater detail, the instant invention provides that the pressure developed within the enclosure being tested is utilized to expand the lower portion 28 of the resilient end member 14 such that the instrument 10 is firmly maintained in fluid-tight relationship with the internal opening 24 of the wall 26.

As most clearly seen in FIGURE 3, the hollow central body portion 12 has a hollow tube 30 extending centrally therethrough. The tube 30 is integrally secured to the body portion 12 at one end thereof with the exterior of the tube and the interior wall 32 of the body portion 12 cooperating to define a chamber 34. A passageway 36 connects the chamber 34 with the interior of the tube 30 through a cavity 38 formed by the end of the plug 20 which is threadably received within one end of the hollow central portion 12. End plug 20 has an internal passageway 40 passing centrally therethrough with one end 42 thereof communicating with chamber 38 and the other end 44 thereof extending into a neck portion 46 upon which the tube 18 may be secured in a conventional manner.

Located within the passageway 40 at end 42 thereof is a valve 56 of conventional design which allows the flow of air in one direction, i.e, from the enclosure being tested toward the measuring device 16, while preventing the flow of air in the opposite direction.

The opposite end of central body portion 12 is provided with a resilient end or nose portion 14 of rubber or equivalent material which is removably secured to the central portion 12 in fluid-tight relationship by means of a flat-headed screw 50 which passes through an opening 52 in the end member 14 into screw-threaded engagement with the interior of hollow tube 30. The interior of the screw 50 is provided with a passageway 54 by which the interior of the enclosure being tested communicates with the interior of the tube 30, the passageway 40, the passageway 36 and the chamber 34.

As shown in FIGURE 3, the interior walls 57 of the resilient end member 14 are cylindrically shaped to snugly but slidably receive the cylindrical end 58 of a piston element 59, and a compressible, expandable gasket-like element 60 having a passageway through which the stem of screw 50 may pass. End 62 of piston element 59 is in abutting relationship with the gasket-like or plug-like member 60 and is also provided with an opening through which the stem of screw 50 may pass. The diameter of the passageway through piston element 59 corresponds to the outside diameter of tube 30 so that the piston may move smoothly thereon. Piston element 59 is preferably rigid and constructed of plastic or other suitable material.

The opposite end 64 of piston element 59 forms a platform which resides within chamber 34. Seated on platform 64 is a slidable, flared rubber gasket 66, the sides 68 of which are spread into sealing relationship with the internal wall 32 of cavity 34 in response to the build-up of pressure within cavity 34.

The operation of the pressure-testing device of the instant invention will now be explained with reference to FIGURES 1, 3 and 4. Assuming it is desirable to measure the pressure developed within an enclosure, one wall of which is designated 26 in FIGURE 1, the pressure-testing device 10 is inserted within the opening 24 through wall 26. As pressure is developed within the enclosure, it is communicated through the interior of screw 50, tube 30, to chamber 38 from which it is diverted into two different paths. One path comprises passageway 40, tube 18, and pressure indicator 16, whereby the pressure being developed can be accurately measured.

Simultaneously, the pressure is communicated through passageway 36 into chamber 34 and against the rear of the flared plug 66. Plug 66 urges piston element 59 downward to compress plug-like element 60 which diametrically expands to urge the side walls 28 of resilient end member 14 into firm fluid-tight engagement with the walls of the opening 24 in wall 26 (see FIGURE 4). It will be appreciated that the higher the pressure developed within the enclosure the greater the side walls 28 of resilient end member 14 will be urged into contact with the opening 24 in wall 26.

With respect to withdrawal of the instant invention, it will be appreciated that when the pressure in the enclosure being tested is reduced, the pressure in chamber 34 is also reduced. With the pressure in chamber 34 back to normal, the natural elasticity of the walls 28 of resilient end member 14 is sufficient to return the plug 60 to its original shape (as in FIGURE 3) which thereby moves the piston element 59 and flared plug 66 upwardly into the chamber 34. With the walls 28 of resilient end member 14 in their natural or relaxed position, the measuring device 10 can be easily withdrawn from the enclosure. To reset the gauge 16 for subsequent use, the pressure retained in passageway 40 and tube 18 by virtue of one-way valve 56, is relieved by opening relief valve 22.

Although there has been described a prefered embodiment of this novel invention, many variations and modifications will now be apparent to those skilled in the art. Therefore, the invention is to be limited not by the specific disclosure therein but only by the appending claims.

What is claimed is:

1. A device for testing pressure within an enclosure comprising:

a hollow central body portion having a hollow tube extending centrally therethrough, said tube being integrally secured to said body portion at one end thereof, the exterior of said tube and the interior walls of said body portion cooperating to define a chamber within said body portion, said body portion having aperture means for providing a passageway between the interior of said tube and said chamber;

a hollow resilient end member removably secured at one end thereof to the opposite end of said central body portion, said resilient end member being adapted to be inserted within an opening in a wall of an enclosure in which pressure is to be tested, the opposite end of said resilient end member having an opening therethrough, said opening communicating with the interior of the enclosure in which pressure is to be tested and with the interior of said hollow tube;

a compressible expansion member having an aperture therethrough, said expansion member positioned within said resilient end member at its opposite end thereof, said aperture communicating with said opening in said end member and with the interior of said tube;

movable piston means encircling said tube, one end of said piston means positioned within said resilient end member abutting said expansion member, the opposite end of said piston means positioned within said chamber between said resilient end member and said aperture means;

and pressure indicator means removably secured to said one end of said central body portion, said pressure indicator means communicating with said chamber and the interior of said tube;

said piston means being movable toward said expansion member in response to a pressure build-up in said chamber to compress and diametrically expand said expansion member to thereby bulge the walls of said end member into firm contact with the walls of the enclosure in which said end member is inserted, said piston means being moved away from said expansion member by the return of said expansion member to its uncompressed state when the pressure within said chamber is reduced.

2. The device of claim 1, wherein the internal walls of said resilient end member form a cylindrical interior and said compressible expansion member is a cylindrical plug residing completely within said resilient end member at its opposite end thereof, compression of said plug in response to movement of said piston means caused by a build-up of pressure within said chamber causing said plug to diametrically expand, thereby bulging the walls of said resilient end member into firm air-tight contact with the walls of the enclosure in which said resilient end member is inserted.

3. The device of claim 2, and further including hollow screw means communicating with the interior of the enclosure in which pressure is to be tested and the interior of said hollow tube for removably securing said resilient end member to the central body portion.

4. A device for testing pressure within a chamber comprising:
- a hollow central body portion having a hollow tube extending centrally therethrough, said tube being integrally secured to said body portion at one end thereof, the exterior of said tube and the interior walls of said body portion cooperating to define a chamber within said body portion, said body portion having a passageway connecting the interior of said tube with said chamber;
- a hollow resilient end member removably secured at one end thereof to the opposite end of said central body portion, said resilient member being adapted to be inserted within an opening in a wall of an enclosure in which pressure is to be tested, the opposite end of said resilient end member having an opening therethrough, said opening communicating with the interior of the enclosure in which pressure is to be tested and with the interior of said hollow tube, the internal walls of said resilient end member forming a cylindrical interior;
- a cylindrically shaped compressible expansion plug having an aperture passing centrally therethrough, said plug fitting snugly entirely within the cylindrical interior of said resilient end member at its opposite end thereof, said aperture communicating with said opening in said end member and with the interior of said tube;
- movable piston means encircling said tube, one end of said piston means being cylindrically shaped and fitting snugly within the cylindrical interior of said resilient end member in abutting relationship with said compressible expansion plug, the opposite end of said piston means positioned snugly within said chamber between said resilient end member and said passageway;
- and pressure indicator means removably secured to said one end of said central body portion, said pressure indicator means communicating with said chamber and the interior of said tube;
- said piston means being movable toward said expansion member in response to a pressure build-up in said chamber to compress and diametrically expand said expansion member to thereby bulge the walls of said end member into firm contact with the walls of the enclosure in which said end member is inserted, said piston means being moved away from said expansion member by the return of said expansion member to its uncompressed state when the pressure within said chamber is reduced.

References Cited
UNITED STATES PATENTS 2,862,386 12/1958 Campbell et al. ____ 73—420 XR
3,260,119 7/1966 Jones _____ 73—420

LOUIS R. PRINCE, *Primary Examiner.*

D. O. WOODIEL, *Assistant Examiner.*